US012625448B2

(12) United States Patent
Kawajiri

(10) Patent No.: US 12,625,448 B2
(45) Date of Patent: May 12, 2026

(54) IMAGE FORMING DEVICE

(71) Applicant: SHARP KABUSHIKI KAISHA, Sakai (JP)

(72) Inventor: Kazuki Kawajiri, Sakai (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/004,743

(22) Filed: Dec. 30, 2024

(65) Prior Publication Data

US 2026/0118805 A1 Apr. 30, 2026

(30) Foreign Application Priority Data

Jan. 11, 2024 (JP) ................................. 2024-002302

(51) Int. Cl.
*G06K 15/14* (2006.01)
*G03G 15/00* (2006.01)
*G06K 15/00* (2006.01)

(52) U.S. Cl.
CPC ..... *G03G 15/5008* (2013.01); *G03G 15/5004* (2013.01); *G03G 15/5033* (2013.01); *G06K 15/14* (2013.01); *G06K 15/4055* (2013.01)

(58) Field of Classification Search
CPC ............... G03G 15/5008; G03G 15/75; G03G 2215/0119; G03G 15/751; G03G 15/757; G03G 21/0005; G03G 21/06; G03G 21/0094
See application file for complete search history.

(56) References Cited

U.S. PATENT DOCUMENTS

2009/0175635 A1* 7/2009 Naoi ................... G03G 15/5008
399/38
2014/0126937 A1* 5/2014 Tokuda .............. G03G 15/0189
399/302
2020/0150575 A1* 5/2020 Yamaki ................. G03G 15/75

FOREIGN PATENT DOCUMENTS

JP H05224509 A 9/1993

* cited by examiner

*Primary Examiner* — Jessica L Eley

(74) *Attorney, Agent, or Firm* — ScienBiziP, P.C.

(57) ABSTRACT

An image forming device includes an image carrier, an image former including a charging member, a rotation driver that rotationally drives the image carrier, a date and time acquirer that acquires a date and time, a receiver that receives predetermined input information, which is an operation and/or a state of predetermined processing or is data, a controller, and a storage. When a determination processor determines that an input detection date and time is a date and time on or after a next rotation date and time, the controller performs predetermined distance rotation control of driving the rotation driver to rotate the image carrier by a predetermined movement distance and then stopping the image carrier.

10 Claims, 10 Drawing Sheets

100 (100A)

IMAGE FORMING DEVICE

TECHNICAL FIELD

The disclosure relates to an imaging forming device such as a copying machine, a multifunction machine, a printer, or a facsimile machine.

BACKGROUND ART

An image forming device employing a contact charging system includes an image carrier such as a photoreceptor drum, a charging member such as a charging roller that comes into contact with and charges the image carrier, and a rotation driver that rotationally drives the image carrier. In such an image forming device, when the image carrier and the charging member are left in contact with each other for a long period of time, a chemical component exudes from the charging member, and the exuded chemical component adheres to the image carrier. As a result of this, a linear image defect having a contact width between the charging member and the image carrier in the circumferential direction (a streaky image defect extending along the rotation axis direction of the image carrier) may occur in a formed image.

In this regard, an image forming device is known that includes a time clocking unit that clocks a stopped period of time during which a charging member (a conductive member) and an image carrier (a body to be charged) are stopped. This image forming device prevents the image carrier and the charging member from being left in contact with each other for a long period of time by driving the charging member and the image carrier when the stopped period of time clocked by the time clocking unit reaches a set stopped period time.

SUMMARY

Technical Problem

However, in such an image forming device, in order to constantly monitor the stopped period of time during which the charging member and the image carrier are stopped, it is necessary to constantly supply power to the time clocking unit, and the power consumption thus increases accordingly.

An object of the disclosure is to provide an image forming device that can effectively prevent an image carrier and a charging member from being left in contact with each other for a long period of time while suppressing power consumption.

Solution to Problem

In order to solve the problem described above, an image forming device according to the disclosure includes an image carrier, an image former including a charging member that comes into contact with a surface of the image carrier and charges the surface of the image carrier, a rotation driver that rotationally drives the image carrier, a date and time acquirer that acquires a date and time, a receiver that receives predetermined input information, the predetermined input information being an operation and/or a state of predetermined processing, or being data, a controller, and a storage. The controller includes a calculation processor that acquires, from the date and time acquirer, a rotation stop date and time, which is a date and time when rotation of the image carrier has stopped, and that stores, in the storage, a date and time obtained by adding a predetermined additional period to the acquired rotation stop date and time, as a next rotation date and time, and a determination processor that acquires a date and time from the date and time acquirer when the receiver has received the predetermined input information, and that determines whether an input detection date and time, which is the acquired date and time, is a date and time on or after the next rotation date and time stored in the storage. When the determination processor determines that the input detection date and time is the date and time on or after the next rotation date and time, the controller performs predetermined distance rotation control of driving the rotation driver to rotate the image carrier by a predetermined movement distance and then stopping the image carrier.

Advantageous Effects of Disclosure

According to the disclosure, it is possible to effectively prevent an image carrier and a charging member from being left in contact with each other for a long period of time while suppressing power consumption.

DESCRIPTION OF EMBODIMENTS

Embodiments according to the disclosure will be described below with reference to the drawings. In the following description, the same components are denoted by the same reference signs. The names and functions of the components are also the same. Accordingly, detailed descriptions thereof are not repeated.

Image Forming Device

Figure 1A:
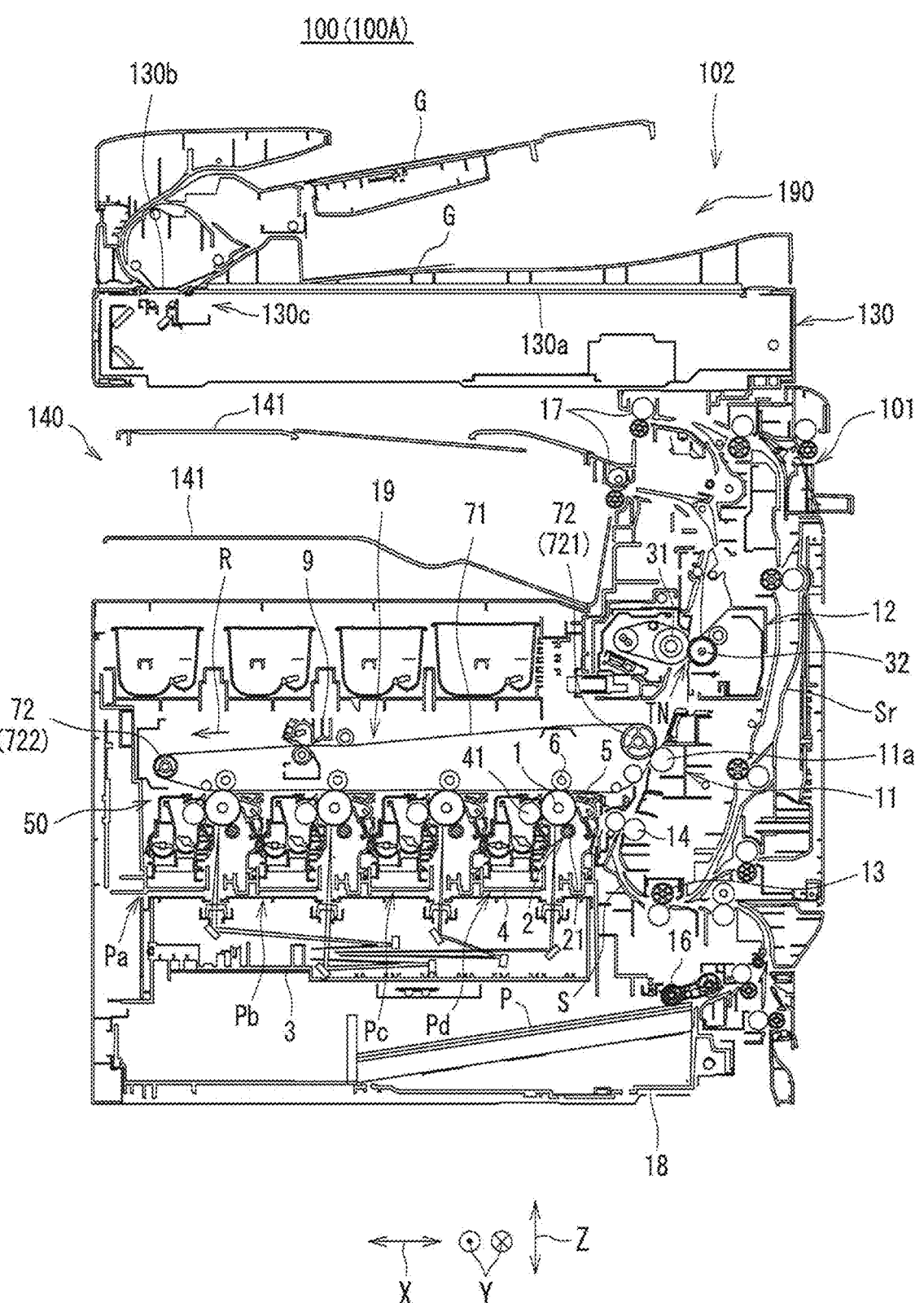
FIG. 1A is a cross-sectional view illustrating a schematic configuration of an example of an image forming device according to an embodiment.
Figure 1B:
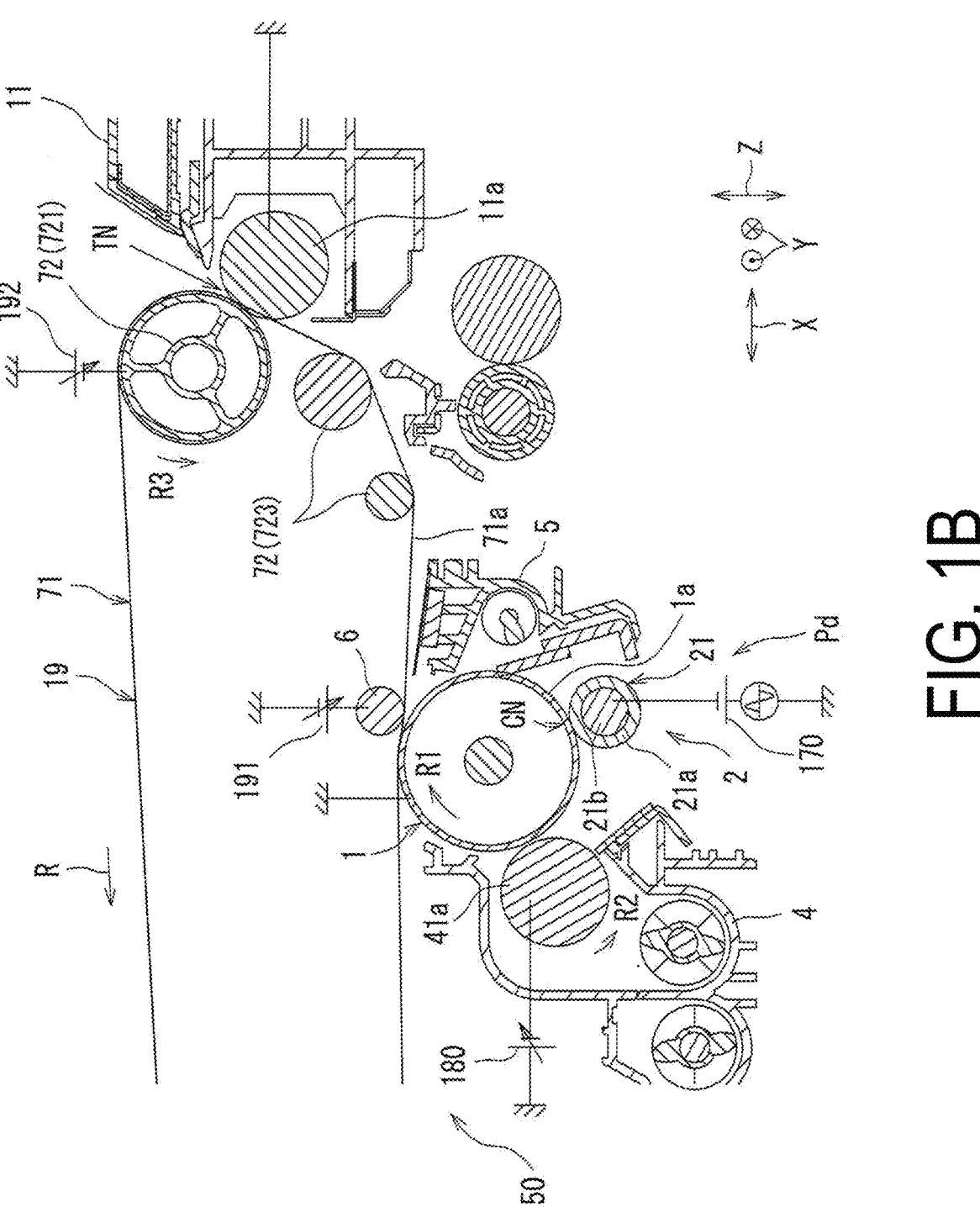
FIG. 1B is a cross-sectional view illustrating a part of an image former of the image forming device illustrated in FIG. 1A.

FIG. 1A is a cross-sectional view illustrating a schematic configuration of an example (100A) of an image forming device 100 according to an embodiment. FIG. 1B is a cross-sectional view illustrating a part of an image former 50 of the image forming device 100 (100A) illustrated in FIG. 1A. Note that, in the drawings, a reference sign X denotes the left-and-right direction, a reference sign Y denotes the depth direction (front-and-back direction), and a reference sign Z denotes the up-and-down direction.

The image forming device 100 (100A) is a multifunction machine having a copy function, a scanner function, a facsimile function, and a printer function, and transmits, to an external device, an image of a document G read by an image reading device 102. Further, on a sheet P such as a paper sheet, the image forming device 100 (100A) forms the image of the document G read by the image reading device 102 or an image received from the external device in color or black and white, using an electrophotographic method.

A document feeding device 190 supported in an openable/ closable manner with respect to an image reader 130 is provided on the upper side of the image reader 130. The image reading device 102 includes the document feeding device 190. The document feeding device 190 transports, to a document reader 130b, one or a plurality of the documents G one sheet at a time. The document G transported one sheet at a time by the document feeding device 190 is read by the image reading device 102 in the document reader 130b. The image reading device 102 also includes a document place- ment table 130a (a document setting platform) on which the document G is placed, and reads the document G placed on the document placement table 130a. The document G placed on the document placement table 130a is read by the image reading device 102 as a result of moving a scanning optical system 130c in a sub-scanning direction orthogonal to a scanning direction. As described above, the image reading device 102 generates image data by reading the document G transported by the document feeding device 190 using the document reader 130b, or generates image data by reading the document G placed on the document placement table 130a by moving the scanning optical system 130c in the sub-scanning direction.

An image forming device main body 101 includes pho- toreceptor drums 1 (an example of an image carrier) on which a toner image is formed, charging devices 2, a charging power source 170 connected to the charging devices 2 (see FIG. 1B), an exposure device 3 (an optical scanning device), development devices 4, a development power source 180 connected to the development devices 4 (see FIG. 1B), a primary transfer belt device 19 (an example of an intermediate transfer device), a primary transfer power source 191 connected to the primary transfer belt device 19 (see FIG. 1B), a transfer device 11 (a secondary transfer device), a transfer power source 192 (a secondary transfer power source) connected to the transfer device 11 (see FIG. 1B), photoreceptor cleaning devices 5 that clean the photo- receptor drums 1 after primary transfer, a fixing device 12, a sheet transport path S, a sheet feeding cassette 18, and sheet discharge trays 141 (a discharge unit 140).

As described above, the image forming device 100 (100A) primarily transfers, to a primary transfer belt 71, a toner image formed using toners of a plurality of colors, and secondarily transfers, to the sheet P, the toner image primar- ily transferred to the primary transfer belt 71.

In the present embodiment, image data corresponding to a color image composed of yellow (Y), magenta (M), and cyan (C), or a monochrome image composed of a single color (for example, black (K)) is used. Note that, in the following description, yellow, magenta, cyan, and black are simply referred to as Y, M, C, and K, respectively.

The image forming device 100 (100A) includes four sets of the photoreceptor drum 1, the charging device 2, the development device 4, and the photoreceptor cleaning device 5, which form four types of toner images, and the four sets respectively serve as image stations Pa, Pb, Pc, and Pd corresponding to the colors Y, M, C, and K, respectively.

Each of the photoreceptor drums 1 includes a grounded cylindrical conductive drum (an annular member made of aluminum or the like) and a photosensitive layer formed on the outer side of the cylindrical conductive drum. The photosensitive layer exhibits insulating properties when it is not irradiated with light, and when it is irradiated with light, a region of the photosensitive layer irradiated with the light changes and becomes conductive. That is, surfaces 1a of the photoreceptor drums 1 are formed by the photosensitive layers. Further, the photoreceptor drums 1 are rotationally driven in a predetermined direction via a drive transmission mechanism to which a rotational force is transmitted from a rotation driver 30 (a drive motor) (not illustrated). In other words, the photoreceptor drums 1 are rotationally driven in a predetermined direction R1 by the rotation driver 30 (see FIG. 1B).

Each of the charging devices 2 includes a charging roller 21 that comes into contact with each of the surfaces 1a of the photoreceptor drums 1. The charging roller 21 includes a metal core and a conductive elastic layer formed on the surface of the metal core. The surface of the conductive elastic layer is provided so as to come into contact with the surface 1a of the photoreceptor drum 1. Note that, in the disclosure, a contact region between the charging roller 21 and the surface 1a of the photoreceptor drum 1 may be referred to as a charging nip portion CN (a charging nip region). The charging power source 170 supplies a charging bias, which is a predetermined voltage or current for charg- ing each of the surfaces 1a of the photoreceptor drums 1 to a predetermined potential, to the metal core of the corre- sponding charging roller 21. When the charging bias is supplied to (the metal core of) the charging roller 21, a potential difference between the surface of the charging roller 21 and the photoreceptor drum 1 causes a minute electric discharge in the vicinity of a contact portion between the charging roller 21 and the photoreceptor drum 1, and the surface 1a of the photoreceptor drum 1 is charged to the predetermined potential. That is, the charging rollers 21 comes into contact with the surfaces 1a of the photoreceptor drums 1 and charges the surfaces 1a of the photoreceptor drums 1. Note that the charging rollers 21 are supported so as to rotate together with the photoreceptor drums 1 when the corresponding photoreceptor drums 1 are rotationally driven in the predetermined direction by the rotation driver 30.

The exposure device 3 exposes the surfaces 1a (the photosensitive layers) of the photoreceptor drums 1 charged to the predetermined potential by the charging devices 2 in accordance with the image data, and forms electrostatic latent images in which the potential of a region where an image is to be formed is lower than the potential of the surfaces 1a of the photoreceptor drums 1.

The development devices 4 develop the electrostatic latent images on the surfaces 1a of the photoreceptor drum 1 to form toner images on the surfaces 1a of the photore- ceptor drums 1. A developing agent containing toner is stored in the development devices 4, and each of the development devices 4 includes a developing roller 41a, on which the developing agent is supported and carried, at a position facing each of the photoreceptor drums 1. The development power source 180 supplies a developing bias, which is a predetermined voltage for supplying toner contained in the developing agent supported and carried by the developing roller 41a, to the electrostatic latent images formed on the surfaces 1a of the photoreceptor drums 1. Further, the developing roller 41a is rotationally driven in a predetermined direction R2 via a drive transmission mechanism to which a rotational force is transmitted from a rotational driver (not illustrated) (see FIG. 1B). The above-described rotation driver 30 and drive transmission mechanism for rotating the receptor drums 1 may be used for the rotation driver and the drive transmission mechanism for rotating the developing roller 41a as a common rotation driver and a common drive transmission mechanism, or the rotation driver and the drive transmission mechanism for rotating the developing roller 41a may be provided separately therefrom.

The photoreceptor cleaning devices 5 remove and collect residual toner remaining on the surfaces 1a the photoreceptor drums 1, which has not been primarily transferred to the primary transfer belt 71 included in the primary transfer belt device 19 described later.

The primary transfer belt device 19 includes the primary transfer belt 71 (the intermediate transfer belt), a primary transfer roller 6 (a primary transfer member), a plurality of belt tensioning rollers 72, and a belt cleaning device 9.

The primary transfer belt 71 is stretched by the belt tensioning rollers 72. The belt tensioning rollers 72 include a driving roller 721, a driven roller 722, and a plurality of tension rollers 723. The driving roller 721 is provided at one side end (the right end side in this example) in the left-and-right direction X of the primary transfer belt device 19. The driven roller 722 is provided at the other side end (the left end side in this example) in the left-and-right direction X of the primary transfer belt device 19. The driving roller 721 is rotationally driven in a predetermined direction R3 via a drive transmission mechanism to which a rotational force is transmitted from a rotation driver (not illustrated) (see FIG. 1B). As a result of this driving roller 721 rotating, the primary transfer belt 71 moves (rotates) in a predetermined movement direction R. The driven roller 722 is driven to rotate in accordance with the movement of the primary transfer belt 71. The above-described rotation driver 30 and drive transmission mechanism for rotating the receptor drums 1 may be used for the rotation driver and the drive transmission mechanism for rotating the primary transfer belt 71 as a common rotation driver and a common drive transmission mechanism, or the rotation driver and the drive transmission mechanism for rotating the primary transfer belt 71 may be provided separately therefrom.

Each of the primary transfer rollers 6 is provided on the inner side of the primary transfer belt 71 so as to cause the primary transfer belt 71 to come into contact with the corresponding photoreceptor drum 1. The primary transfer power source 191 supplies, to the primary transfer rollers 6, a primary transfer bias which is a voltage or a current for transferring, to the primary transfer belt 71, the four types of toner images formed on the surfaces 1a of the photoreceptor drums 1 corresponding to the respective colors. As a result of being supplied with the primary transfer bias, the primary transfer rollers 6 primarily transfer, to the primary transfer belt 71, the toner images formed on the surfaces 1a of the photoreceptor drums 1. The belt cleaning device 9 removes and collects waste toner, which has not been transferred, by the transfer device 11 described below, to the sheet P and remains on a surface 71a of the primary transfer belt 71.

The transfer device 11 includes a transfer roller 11a that comes into contact with the primary transfer belt 71 and is driven to rotate by the rotation of the primary transfer belt 71. The transfer roller 11a transports the sheet P that has been transported through the sheet transport path S, with the sheet P nipped at a transfer nip portion TN (a transfer nip region), which is a contact portion between the transfer roller 11a and the primary transfer belt 71. The transfer power source 192 supplies, to the transfer roller 11a, a transfer bias which is a predetermined voltage or current for secondarily transferring, to the sheet P, the toner image primarily transferred to the surface of the primary transfer belt 71. As a result of being supplied with the transfer bias, the transfer roller 11a secondarily transfers the toner image on the surface 71a of the primary transfer belt 71, to the sheet P passing through the transfer nip portion TN. The sheet P, to which the toner image has been secondarily transferred at the transfer nip portion TN, is transported to the fixing device 12.

The fixing device 12 includes a fixing roller 31 and a pressure roller 32 that rotate while sandwiching the sheet P. The fixing roller 31 or the pressure roller 32 is heated to a predetermined temperature by a heat source (not illustrated). The fixing device 12 heats and pressurizes the sheet P on which the toner image has been transferred while nipping the sheet P between the fixing roller 31 and the pressure roller 32, and fixes the toner image onto the sheet P with the heat and the pressure. Either the fixing roller 31 or the pressure roller 32 is rotationally driven in a predetermined direction via a drive transmission mechanism (not illustrated) to which a rotational force is transmitted from the rotation driver 30. The above-described rotation driver 30 and drive transmission mechanism for rotating the receptor drums 1 may be used for the rotation driver and the drive transmission mechanism for rotating either the fixing roller 31 or the pressure roller 32 as a common rotation driver and a common drive transmission mechanism, or the rotation driver and the drive transmission mechanism for rotating either the fixing roller 31 or the pressure roller 32 may be provided separately therefrom. Further, power required for the heat generation is supplied to the heat source (not illustrated) from a fixing power source (not illustrated).

As described above, the image forming device 100 (100A) includes the image former 50 that includes the photoreceptor drums 1, the charging devices 2, the exposure device 3, the development devices 4, the primary transfer belt device 19, the transfer device 11, the photoreceptor cleaning devices 5, and the fixing device 12. It can be said that the image former 50 includes at least the photoreceptor drums 1 and the charging rollers 21 that come into contact with the surfaces 1a of the photoreceptor drums 1 and charge the surfaces 1a of the photoreceptor drums 1.

The sheet feeding cassette 18 is provided below the exposure device 3 and stores the sheet P to be used for image formation.

In the image forming device 100 (100A), when image formation (printing) is performed, the sheet P drawn out from the sheet feeding cassette 18 by a pickup roller 16 is transported to a resist roller 14 by a transport roller 13 provided along the sheet transport path S. Subsequently, the sheet P is transported at a timing at which the sheet P and the toner image on the primary transfer belt 71 are aligned with each other, and the toner image on the photoreceptor drum 1 is transferred onto the sheet P by the transfer device 11. Thereafter, unfixed toner on the sheet P is fixed by the fixing device 12, and the sheet P is discharged onto the sheet discharge tray 141 via the transport roller 13 and a discharge roller 17. Further, when the image formation (printing) is performed not only on the front surface but also on the back surface of the sheet P, the sheet P is transported in a reverse direction from the discharge roller 17 to a sheet reverse path Sr, and the front and back of the sheet P is reversed. Subsequently, the sheet P is guided once again to the resist roller 14, an image is formed on the back surface of the sheet P in the same manner as on the front surface of the sheet P, and the sheet P is transported onto the sheet discharge tray 141. Here, the pickup roller 16, the transport roller 13, the resist roller 14, and the discharge roller 17 are rotationally driven in a predetermined direction via a drive transmission mechanism to which a rotational force from a rotation driver (a drive motor) (not illustrated) is transmitted. The above-described rotation driver and drive transmission mechanism for rotating the receptor drums 1 may be used for the rotation driver and the drive transmission mechanism for rotating the pickup roller 16, the transport roller 13, the resist roller 14, and the discharge roller 17 as a common rotation driver and a common drive transmission mechanism, or the rotation driver and the drive transmission mechanism for rotating the pickup roller 16, the transport roller 13, the resist roller 14, and the discharge roller 17 may be provided separately therefrom.

Note that, although FIG. 1A illustrates, as an example, a configuration in which one sheet feeding cassette 18 is provided, the configuration is not limited to this example. A plurality of the sheet feeding cassettes 18 may be provided, and the plurality of sheet feeding cassettes 18 may be loaded with different types of the sheets P, respectively.

Figure 2A:
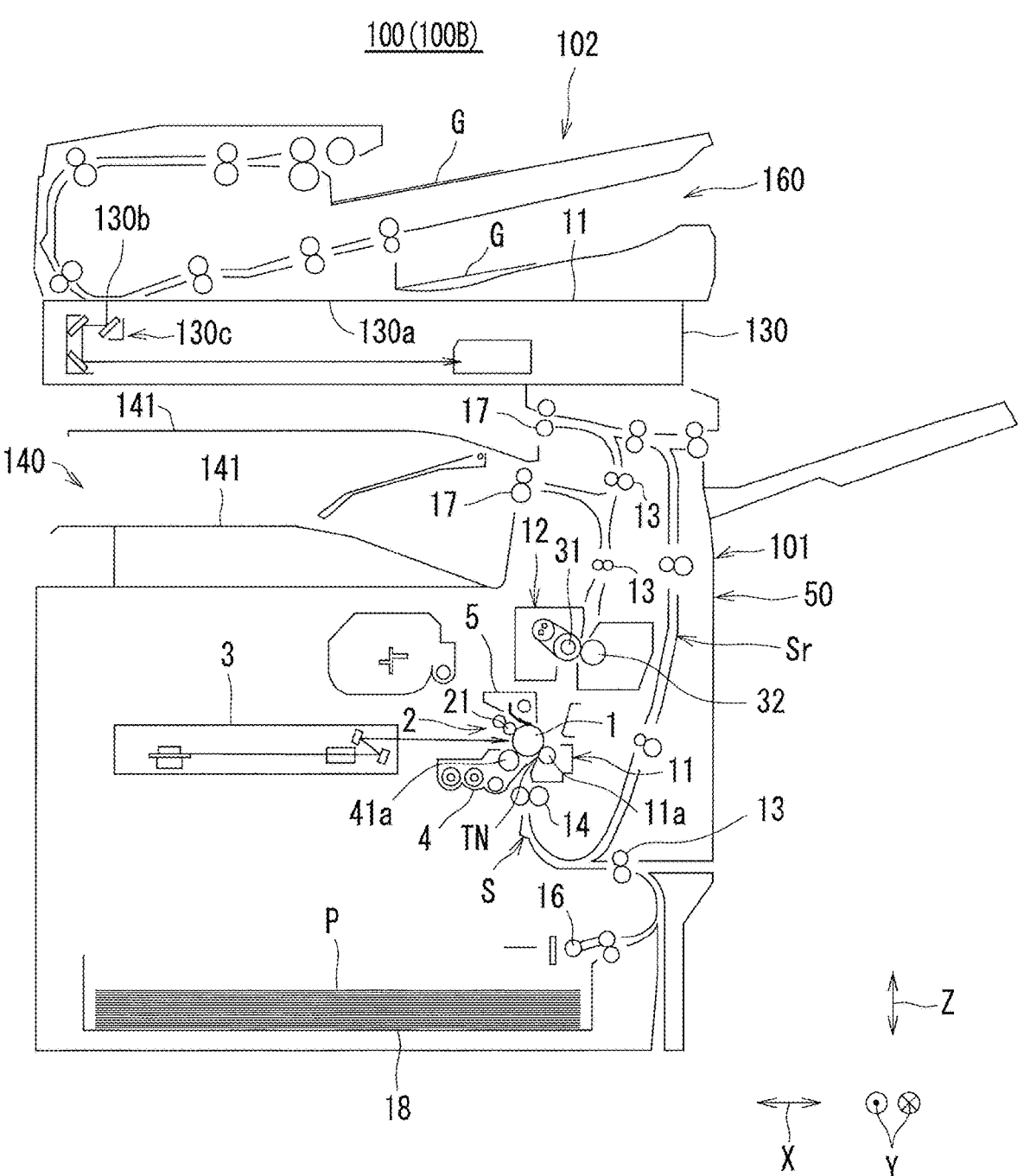
FIG. 2A is a schematic cross-sectional view of another example of the image forming device according to the present embodiment when viewed from the front.
Figure 2B:
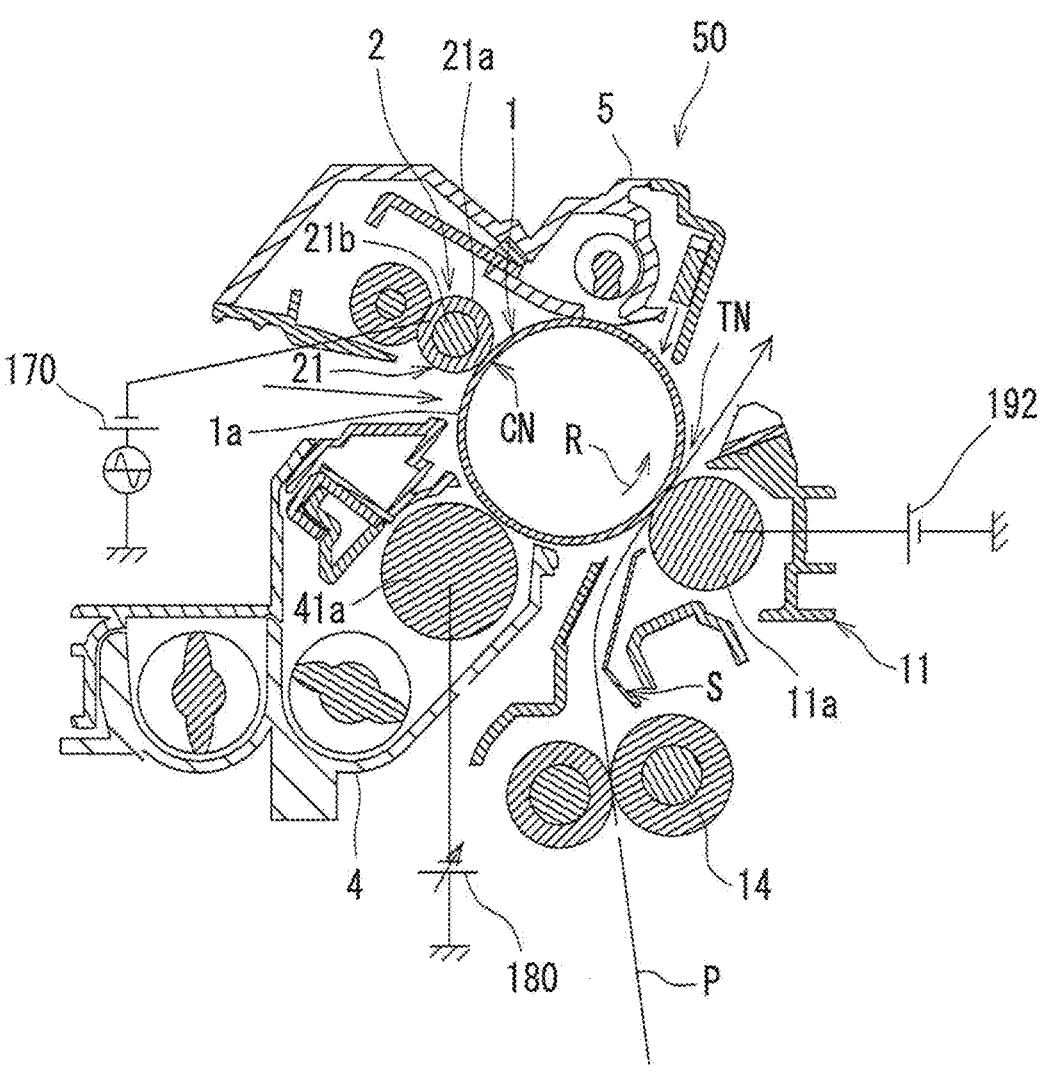
FIG. 2B is a schematic cross-sectional view illustrating the image former of the image forming device illustrated in FIG. 2A.

FIG. 2A is a schematic cross-sectional view of another example (100B) of the image forming device 100 according to the present embodiment. FIG. 2B is a schematic cross-sectional view illustrating the image former 50 of the image forming device 100 (100B) illustrated in FIG. 2A. Note that, in the image forming device 100 (100B) illustrated in FIG. 2A, substantially the same components as those of the image forming device 100 (100A) illustrated in FIG. 1A are denoted by the same reference signs, and descriptions thereof are omitted.

The image forming device 100 (100B) illustrated in FIG. 2A is an image forming device that forms a monochrome image on the sheet P using an electrophotographic method in accordance with image data read by the image reading device 102, or image data transmitted from an external device. Therefore, the image forming device 100 (100B) is different from the image forming device 100 (100A) illustrated in FIG. 1A in that a color image cannot be formed on the sheet P, that is, only one photoreceptor drum 1 is provided and the primary transfer belt device 19 is not provided. Therefore, next, the transfer device 11 for directly transferring the toner image formed on the surface 1a of the photoreceptor drum 1 onto the sheet P will be described.

The transfer device 11 includes the transfer roller 11a that comes into contact with the surface 11a of the photoreceptor drum 1. The transfer nip portion TN (transfer nip region) is formed between the transfer roller 11a and the photoreceptor drum 1 (an example of an image forming body), and the transfer roller 11a transports the sheet P, which has been transported along the sheet transport path S, while nipping the sheet P at the transfer nip portion TN. The transfer roller 11a is driven to rotate by the rotation of the photoreceptor drum 1. The transfer power source 192 supplies, to the transfer roller 11a, a transfer bias which is a predetermined voltage or current for electrostatically moving the toner image formed on the surface 1a of the photoreceptor drum 1 to the sheet P. The toner image formed on the surface 1a of the photoreceptor drum 1 is electrostatically transferred to the sheet P by the transfer bias, which is supplied from the transfer power source 192 when the sheet P passes through the transfer nip portion TN.

In the image forming device 100 (100B), when image formation (printing) is performed, the sheet P drawn out from the sheet feeding tray 8 by the pickup roller 16 is transported to the resist roller 14 by the transport roller 13 provided along the sheet transport path S. Subsequently, the sheet P is transported at the timing at which the sheet P and the toner image on the photoreceptor drum 1 are aligned with each other, and the toner image on the photoreceptor drum 1 is transferred onto the sheet P by the transfer device 11. Thereafter, unfixed toner on the sheet P is fixed by the fixing device 12, and the sheet P is discharged onto the sheet discharge tray 141 via the transport roller 13 and the discharge roller 17.

In this way, the image forming device 100 (100A, 100B) completes a series of printing operations. Hereinafter, the image forming device 100 (100A, 100B) is simply referred to as the image forming device 100.

As described above, the image forming devices 100 (100A and 100B) are the same in that each of the image forming devices 100 includes the charging roller 21 that comes into contact with the surface 1a of the photoreceptor drum 1 in order to charge the surface 1a of the photoreceptor drum 1 to the predetermined potential. In other words, the image forming device 100 (100A, 100B) includes the charging roller 21 that comes into contact with the surface 1a of the photoreceptor drum 1 and charges the surface 1a of the photoreceptor drum 1.

As described above, in the present embodiment, the image forming device 100 includes an image carrier (in this example, the photoreceptor drum 1), a charging member (in this example, the charging roller 21) that comes into contact with and charges the surface 1a of the photoreceptor drum 1, and the rotation driver 30 (drive motor) that rotationally drives the photoreceptor drum 1. In this example, when the photoreceptor drum 1 is rotated by the rotation driver 30, the charging roller 21 is rotated (driven to rotate) together with the photoreceptor drum 1.

Here, a conductive elastic layer 21a is formed on the outer circumferential surface of a conductive rotation shaft 21b (a conductive support) of the charging roller 21. Examples of the material of the rotation shaft 21b include a round bar made of a metal material such as iron, copper, stainless steel, aluminum, or nickel.

Examples of the material of the elastic layer 21a include natural rubber, synthetic rubbers such as ethylene-propylene rubber (EPDM), styrene-butadiene rubber (SBR), silicone rubber, urethane rubber, epichlorohydrin rubber, isoprene rubber (IR), butadiene rubber (BR), nitrile-butadiene rubber (NBR), and chloroprene rubber (CR), and elastic materials such as polyamide, urethane resins, and silicone resins appropriately added with a conductive agent having an electronic conduction mechanism such as carbon black, graphite, and conductive metallic oxides, or a conductive agent having an ionic conduction mechanism such as alkali metallic salt and quaternary ammonium salt.

Note that a resistive layer may be provided on the surface of the elastic layer 21a in order to adjust the electrical resistance of the entire charging roller 21. As the resistive layer, a material having conductivity or semiconductivity can be used.

Incidentally, in the image forming device 100, when the photoreceptor drum 1 and the charging roller 21 comes into contact with each other and left in a stationary state for a long period of time, a chemical component of an additive such as softening oil or plasticizer contained in the elastic layer 21a exudes from the surface of the charging roller 21, and the exuded chemical component of the additive adheres to the photoreceptor drum 1. As a result, a linear image defect having a contact width between the charging roller 21 and the photoreceptor drum 1 in the circumferential direction (a streaky image defect along the rotation axis direction of the photoreceptor drum 1) may occur in a formed image.

Here, in related art, a time clocking unit is provided to measure the time elapsed after the photoreceptor drum 1 is stopped, and the photoreceptor drum 1 is rotated when a stopped period of time during which the photoreceptor drum 1 is stopped reaches a set stopped period of time in order to prevent the photoreceptor drum 1 and the charging roller 21 from being left in contact with each other at the same position for a long period of time. Thus, in the image forming device 100, it is necessary to continuously supply power to a controller, a drive source for driving the photoreceptor drum 1, and the like, in order to measure the elapsed time by the elapsed time clocking unit. Therefore, there has been a problem in that extra power is consumed in the image forming device 100.

First Embodiment

In a first embodiment, a system configuration is adopted in which the photoreceptor drum 1 and the charging roller 21 are not left in contact with each other at the same position for a long period time while suppressing power consumption consumed after the photoreceptor drum 1 is brought into a stopped state. This system configuration is described with reference to FIG. 3.

Figure 3:
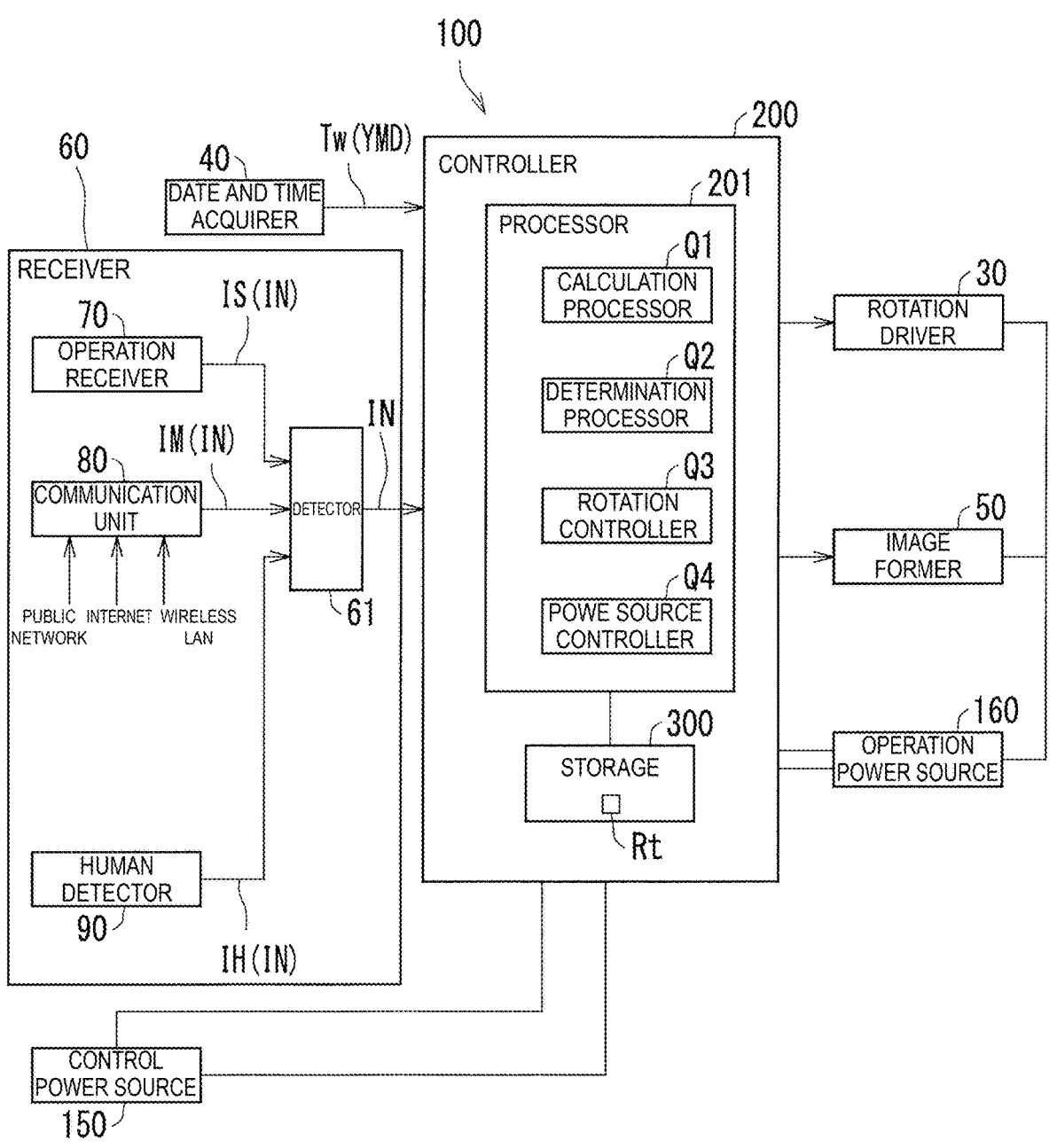
FIG. 3 is a schematic block diagram illustrating a system configuration of the image forming device according to a first embodiment.

FIG. 3 is a schematic block diagram illustrating the system configuration of the image forming device 100 according to the first embodiment.

As illustrated in FIG. 3, the image forming device 100 further includes a date and time acquirer 40 (clock unit), a receiver 60, a controller 200, and a storage 300. The date and time acquirer 40 is a clock that has a clock function including a calendar function and clocks a date and time YMD. The receiver 60 includes an operation receiver 70 (an operation panel) that allows an operator to select and execute processing to be performed by the image forming device 100, a communication unit 80 that performs communication with the Internet or the like, a human detector (human sensor) 90 that detects an approach of the operator to the image forming device 100, and a detector 61 that detects whether there has been an input from the above-described units, that is, whether predetermined input information IN, which is a predetermined process or state or is data, has been received. That is, the receiver 60 is configured to receive the predetermined input information IN, which is an operation and/or a state of predetermined processing or is data. The date and time acquirer 40 and the detector 61 are connected to an input system of the controller 200, and the rotation driver 30 and the image former 50 are connected to an output system of the controller 200. Note that the date and time acquirer 40 is configured to operate by a backup power source such as a detachable or rechargeable battery, even when a power source (a control power source 150 described later) of a main body is in an OFF state.

As illustrated in FIG. 3, the controller 200 includes a processor 201 constituted by a computer such as a central processor (CPU), and the storage 300 that includes a non-volatile memory such as a read only memory (ROM) and a volatile memory such as a random access memory (RAM). The controller 200 loads a control program stored in advance in the ROM of the storage 300 onto the RAM of the storage 300 and executes the control program to cause the processor 201 to perform operation control (control processing) of various components. The storage 300 is connected to the processor 201. Note that the controller 200 can perform the operation control of the various components by receiving a power supply from the control power source 150.

(The processor 201 of) the controller 200 includes a calculation processor Q1, a determination processor Q2, a rotation controller Q3, and a power source controller Q4.

The calculation processor Q1 acquires, from the date and time acquirer 40, a rotation stopped date and time, which is the date and time YMD when the rotation controller Q3 has stopped the rotation of the photoreceptor drum 1, and stores, in the storage 300, a date and time obtained by adding a predetermined additional period T1 (a period of time or the number of days before the next rotation of photoreceptor drum 1, for example, five days) to the rotation stopped date and time acquired from the date and time acquirer 40 as a next rotation date and time Rt. The additional period T1 is a period in which an image defect does not occur even if the photoreceptor drum 1 is left in the stopped state and a chemical component exudes from the charging roller 21. This additional period T1 is obtained through an experiment and stored in the storage 300 in advance.

The determination processor Q2 acquires, from the date and time acquirer 40, an input detection date and time Tw, which is the date and time YMD when the detector 61 has detected the reception of the input information IN, and determines whether the acquired input detection date and time Tw is a date and time on or after the next rotation date and time Rt stored in the storage 300. In other words, when the receiver 60 receives the predetermined input information IN, the determination processor Q2 acquires the date and time from the date and time acquirer 40, and determines whether the input detection date and time Tw, which is the acquired date and time, is a date and time on or after the next rotation date and time Rt stored in the storage 300.

When the determination processor Q2 determines that the input detection date and time Tw is a date and time on or after the next rotation date and time Rt, the rotation controller Q3 performs predetermined distance rotation control of driving the rotation driver 30 to rotate the photoreceptor drum 1 by a predetermined movement distance (a surface movement distance, a rotation angle) and then stopping the photoreceptor drum 1 after rotating the photoreceptor drum 1 by the predetermined movement distance. In other words, when the determination processor Q2 determines that the input detection date and time Tw is a date and time on or after the next rotation date and time Rt, the controller 200 performs the predetermined distance rotation control of driving the rotation driver 30 to rotate the photoreceptor drum 1 by the predetermined movement distance and then stopping the photoreceptor drum 1.

As described above, according to the present embodiment, the next rotation date and time Rt is calculated that is obtained by adding the predetermined additional period T1 to the rotation stop date and time, which is the date and time YMD clocked by the date and time acquirer 40 when the rotation of the photoreceptor drum 1 is stopped, and the next rotation date and time Rt is stored in the storage 300. In this way, the elapsed time from the date and time when the input information IN has been received can be determined. That is, unlike the configuration of the related art, it is not necessary to constantly supply power to a time clocking unit in order to constantly monitor the stopped period of time during which the charging roller 21 and the photoreceptor drum 1 are stopped, and power consumption can thus be suppressed accordingly. Moreover, it is determined whether the input detection date and time Tw, which is the date and time YMD acquired by the date and time acquirer 40 when the reception of the input information IN is detected, is a date and time on or after the next rotation date and time Rt stored in the storage 300, and when it is determined that the input detection date and time Tw is a date and time on or after the next rotation date and time Rt, the photoreceptor drum 1 is rotated by the predetermined movement distance by the rotation driver 30. Therefore, the contact position between the photoreceptor drum 1 and the charging roller 21 can be shifted, and it is thus possible to effectively prevent the photoreceptor drum 1 and the charging roller 21 from being left in contact with each other for a long period of time. Note that the input detection date and time Tw acquired by the date and time acquirer 40 may be acquired by a date and time information provision service provided on the Internet via the communication unit 80.

First Embodiment—1

In the present embodiment, the controller 200 causes the rotation controller Q3 to rotate the photoreceptor drum 1 by the predetermined movement distance, causes the calculation processor Q1 to calculate the next rotation date and time Rt at the timing when the rotation of the photoreceptor drum 1 is completed, and updates the old next rotation date and time Rt stored in the storage 300 to the new next rotation date and time Rt calculated by the calculation processor Q1. That is, the value of the next rotation date and time Rt stored in the storage 300 is overwritten to be updated and saved. In other words, when the predetermined distance rotation control is performed and the photoreceptor drum 1 is stopped, the calculation processor Q1 calculates the next rotation date and time Rt and stores the next rotation date and time Rt in the storage 300.

In this way, the next rotation date and time Rt can be updated to the latest next rotation date and time Rt.

First Embodiment—2

When the photoreceptor drum 1 is rotated upon detecting the reception of the input information IN, that is, when the rotation controller Q3 rotates the photoreceptor drum 1 based on a determination result of the determination processor Q2, it is sufficient that the charging roller 21 is rotated and moved so that a region, of the outer surface of the charging roller 21, in contact with the photoreceptor drum 1 is separated from a region, of the photoreceptor drum 1, in contact with the charging roller 21. In order to do so, as described above, since the charging roller 21 rotates together with the photoreceptor drum 1, it is only necessary to move the photoreceptor drum 1 by a predetermined distance or more in the circumferential direction of the photoreceptor drum 1 at the charging nip portion, and it is not necessary to rotate the charging roller 21 by one rotation.

Specifically, the predetermined movement distance may be more than one time (for example, two times or more) and equal to or less than five times, and preferably about 2.5 times to four times the contact width (for example, about 1 mm to 3 mm) of the contact portion between the charging roller 21 and the photoreceptor drum 1 in the circumferential direction. By moving the charging roller 21 in this manner, the region of the photoreceptor drum 1, which has been in contact with the charging roller 21, is moved from the position of the charging nip portion CN, and thus the chemical component exuded from the charging roller 21 is not supplied to the region. By repeating such a movement when a predetermined stationary time or more has elapsed, it is possible to prevent the chemical component exuding from the charging roller 21 from being supplied to a portion of the photoreceptor drum 1 in a concentrated manner. Further, by rotating the photoreceptor drum 1 when the reception of the input information IN has been detected, it is possible to reduce power consumption required for the rotation operation as much as possible.

First Embodiment—3

In the present embodiment, the image forming device 100 further includes the control power source 150 that supplies, to the controller 200, power required for the controller 200 to operate, and an operation power source 160 that supplies power required for the image former 50 and the rotation driver 30 to operate. The control power source 150 is connected to the controller 200 and supplies, to the controller 200, power required for the operation of the controller 200. The controller 200 can selectively execute a first mode MD1 (an operation-ready mode) in which image forming processing can be performed and a second mode MD2 (energy-saving mode) in which power consumption is reduced to be less than that of the first mode MD1.

In the first mode MD1, the controller 200 turns on the operation power source 160 so that a first consumption power required for the image forming processing can be supplied. Further, in the second mode MD2, the operation power source 160 is turned off and a second consumption power, which is smaller than the first consumption power, is supplied from the control power source 150 so that a non-image forming operation (a non-rotating operation of the photoreceptor drum 1) other than an image forming operation can be performed. That is, the controller 200 can selectively execute the first mode MD1 in which power is supplied from the control power source 150 to the controller 200 and power is supplied from the operation power source 160 to the image former 50 and the rotation driver 30, and the second mode MD2 in which power is supplied from the control power source 150 to the controller 200 and the operation power source 160 is turned off. Here, examples of the non-image forming operation include reception and transmission of a facsimile, and/or reception of an image signal from a personal computer, a mobile terminal, and/or a print server.

The control power source 150 constantly supplies power to the controller 200 and selectively switches between the first mode MD1 and the second mode MD2 in response to an instruction signal from the controller 200. The switching between the first mode MD1 and the second mode MD2 by the controller 200 is performed as follows. That is, the processor 201 of the controller 200 executes the first mode MD1 during a predetermined stand-by period T2 (for example, one minute), which is shorter than the additional period T1 (for example, five days), after processing such as the image forming processing is performed and the rotation of the photoreceptor drum 1 is stopped (that is, from the rotation stop date and time), and executes the second mode T2 when the receiver 60 does not receive the predetermined input information IN during the stand-by period T2. Then, when the receiver 60 receives the input information IN during the execution of the second mode MD2, the determination processor Q2 determines whether to perform the predetermined distance rotation control. In other words, the controller 200 executes the first mode MD1 during the stand-by period T2, which is a period shorter than the predetermined additional period T1, starting from the rotation stop date and time, executes the second mode T2 when the receiver 60 does not receive the predetermined input information IN during the stand-by period T2, and performs a determination by the determination processor Q2 when the receiver 60 receives the input information IN during the execution of the second mode MD2. Here, since the detector 61 is supplied with power from the control power source 150, even when the second mode MD2 is selected, it is possible to detect whether the input information IN has been received.

In this way, the detector 61 detects whether the input information IN has been received in the second mode MD2 in which power consumption is reduced to be less than that of the first mode MD1. Thus, by detecting the input information IN in a state in which the power consumption is suppressed and by determining that the input detection date and time Tw is a date and time on or after the next rotation date and time Rt, it is possible to rotate the photoreceptor drum 1 by the predetermined movement distance by the rotation driver 30. Therefore, it is possible to effectively prevent the photoreceptor drum 1 and the charging roller 21 from being left in contact with each other for a long period of time while further suppressing power consumption.

First Embodiment—4

Incidentally, in the case of the image forming operation or the like, the photoreceptor drum 1 may be rotated by a distance longer than the predetermined distance, by which the photoreceptor drum 1 is moved during the execution of the second mode MD2. In this case also, the contact position between the photoreceptor drum 1 and the charging roller 21 can be shifted.

Therefore, in the present embodiment, when the rotation controller Q3 rotates the photoreceptor drum 1 by a distance longer than the predetermined movement distance (for example, in the case of the image forming operation), the controller 200 causes the calculation processor Q1 to calculate the next rotation date and time Rt when the rotation of the photoreceptor drum 1 is stopped, and newly stores the calculated next rotation date and time Rt in the storage 300 to update the next rotation date and time Rt. More specifically, when the input information IN is an execution (information) of the image forming processing, without performing the predetermined distance rotation control, the rotation driver 30 is controlled to rotate the photoreceptor drum 1, and the image former 50 is operated to form an image. Then, after the image forming processing is completed, at the timing when the photoreceptor drum 1 is stopped, the next rotation date and time Rt is calculated by the calculation processor Q1, and the next rotation date and time Rt is newly stored in the storage 300 to update the next rotation date and time Rt.

In this way, even in the case of the image forming operation or the like, the next rotation date and time Rt can be updated to the latest next rotation date and time Rt.

First Embodiment—5

Incidentally, examples of a detection trigger in terms of detecting the input information IN by the detector 61 include reception of input operation information indicating an input operation by an operator, reception of communication information from an external device, and reception of detection information indicating an approach of a person.

Specifically, the image forming device 100 according to the present embodiment includes the operation receiver 70 (the operation panel) that receives an input of operation information indicating an input operation by an operator. The operation receiver 70 includes a touch-type liquid crystal panel and hardware keys such as numeric keys. The operation receiver 70 is connected to the detector 61, and transmits the operation information to the detector 61. In this way, the detector 61 can detect the operation information from the operation receiver 70. The input information IN includes, of the operation information received by the operation receiver 70, non-rotation operation information IS that does not cause the photoreceptor drum 1 to rotate, and execution information of the image forming processing that causes the image former 50 to form an image.

Here, examples of the non-rotation operation include a pressing operation of a hardware key of the operation receiver 70, which is not involved in the rotation of the photoreceptor drum 1 (for example, a pressing operation on a numeric keypad, a mode switching key operation for switching to the energy-saving mode, and a document reading operation in the image reading unit 130).

In this way, using the existing operation receiver 70, the input information IN including the non-rotation operation information IS can be easily detected by the detector 61.

First Embodiment—6

The image forming device 100 according to the present embodiment includes the communication unit 80 that receives an input of communication information IM from an external device. The communication unit 80 is connected to the detector 61, and transmits the communication information IM received by the communication unit 80 to the detector 61. In this way, the detector 61 can detect the communication information IM from the communication unit 80.

Here, when the communication unit 80 is connected to a public network and/or the Internet and/or a wireless LAN, examples of the communication information IM include image information from a facsimile machine and/or a personal computer and/or a print server.

In this way, by using the communication unit 80 that receives the input of the communication information IM from the external device, the input information IN including the communication information IM can be easily detected by the detector 61.

First Embodiment—7

The image forming device 100 according to the present embodiment includes the human detector 90 (the human detection sensor) that detects an approach of a person. The human detector 90 is connected to the detector 61 and transmits, to the detector 61, human detection information IH indicating that a person has been detected by the human detector 90. In this way, the detector 61 can detect the human detection information IH from the human detector 90. The input information IN includes the human detection information IH.

In this way, using the human detector 90 that detects the approach of a person, the input information IN including the human detection information IH can be easily detected. FIG.

4 is a flowchart illustrating an example of a control operation for controlling the rotation of the photoreceptor drum 1 in the first embodiment.

Figure 4:
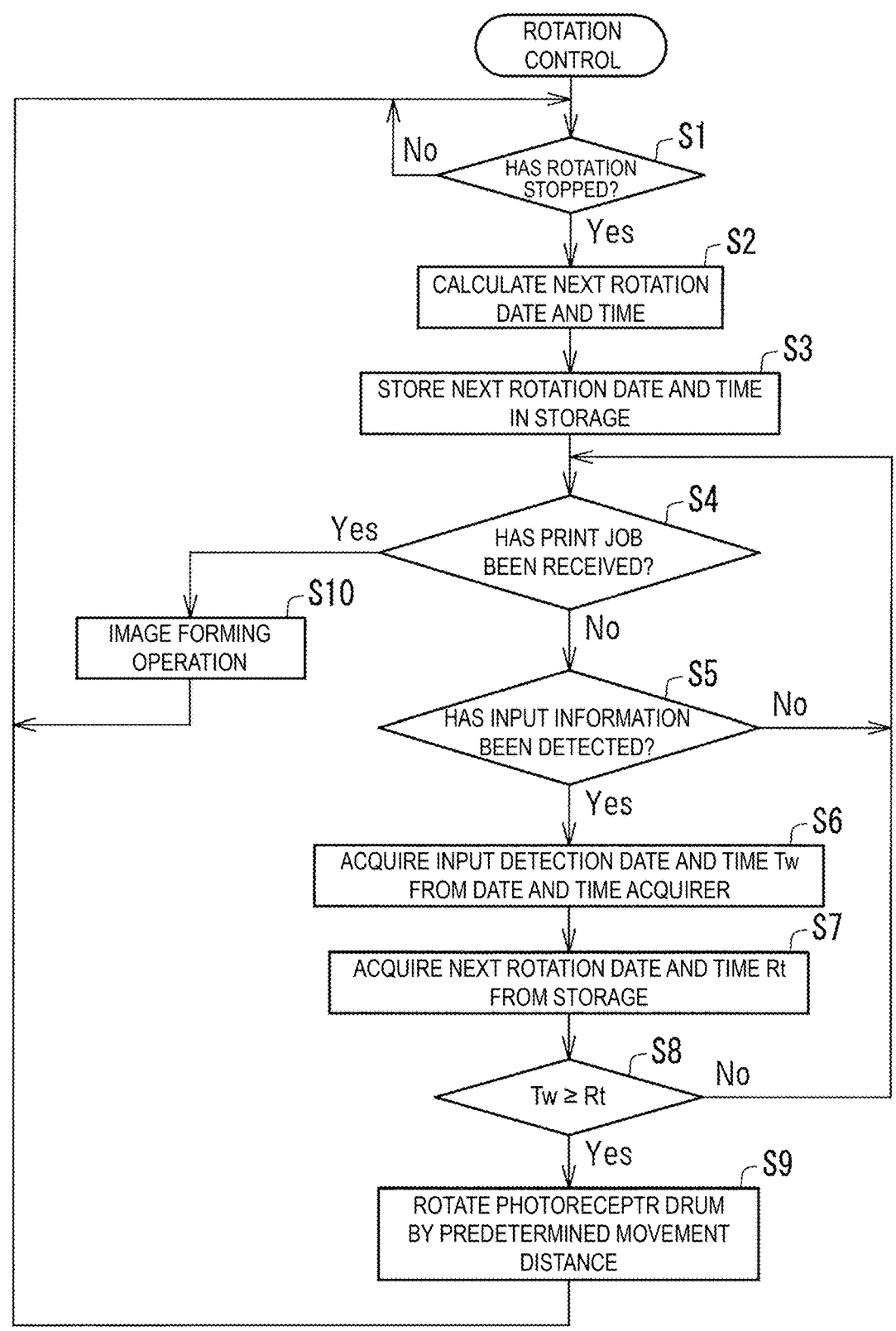
FIG. 4 is a flowchart illustrating an example of a control operation for controlling rotation of a photoreceptor drum in the first embodiment.

In the flowchart illustrated in FIG. 4, first, when the controller 200 detects that the rotation of the photoreceptor drum 1 has stopped (step S1: Yes), the controller 200 acquires the current date and time from the date and time acquirer 40, causes the calculation processor Q1 to calculate the next rotation date and time Rt (step S2), and causes the storage 300 to store the next rotation date and time Rt (step S3).

Subsequently, the controller 200 determines whether a print job has been received (step S4). When it is determined that the print job has not been received (step S4: No), the controller 200 determines whether the detector 61 has detected the input information IN (step S5). In a state in which the input information IN is not detected (step S5: No), the controller 200 proceeds to step S4. On the other hand, when it is determined that the input information IN has been detected (step S5: Yes), the controller 200 acquires the input detection date and time Tw from the date and time acquirer 40 (step S6), acquires the next rotation date and time Rt from the storage 300 (step S7), and causes the determination processor Q2 to determine whether the input detection date and time Tw is a date and time on or after the next rotation date and time Rt (step S8).

When it is determined that the input detection date and time Tw has not reached the next rotation date and time Rt (step S8: No), the controller 200 proceeds to step S4. On the other hand, when the controller 200 determines that the input detection date and time Tw is a date and time after the next rotation date and time Rt (step S8: Yes), the controller 200 causes the rotation controller Q3 to rotate the photoreceptor drum 1 by the predetermined movement distance using the rotation driver 30 (step S9), and proceeds to step S1.

Further, when it is determined that the print job has been received (step S4: Yes), the controller 200 causes the image former 50 to perform the image forming operation (step S10) and proceeds to step S1.

Second Embodiment

Figure 5:
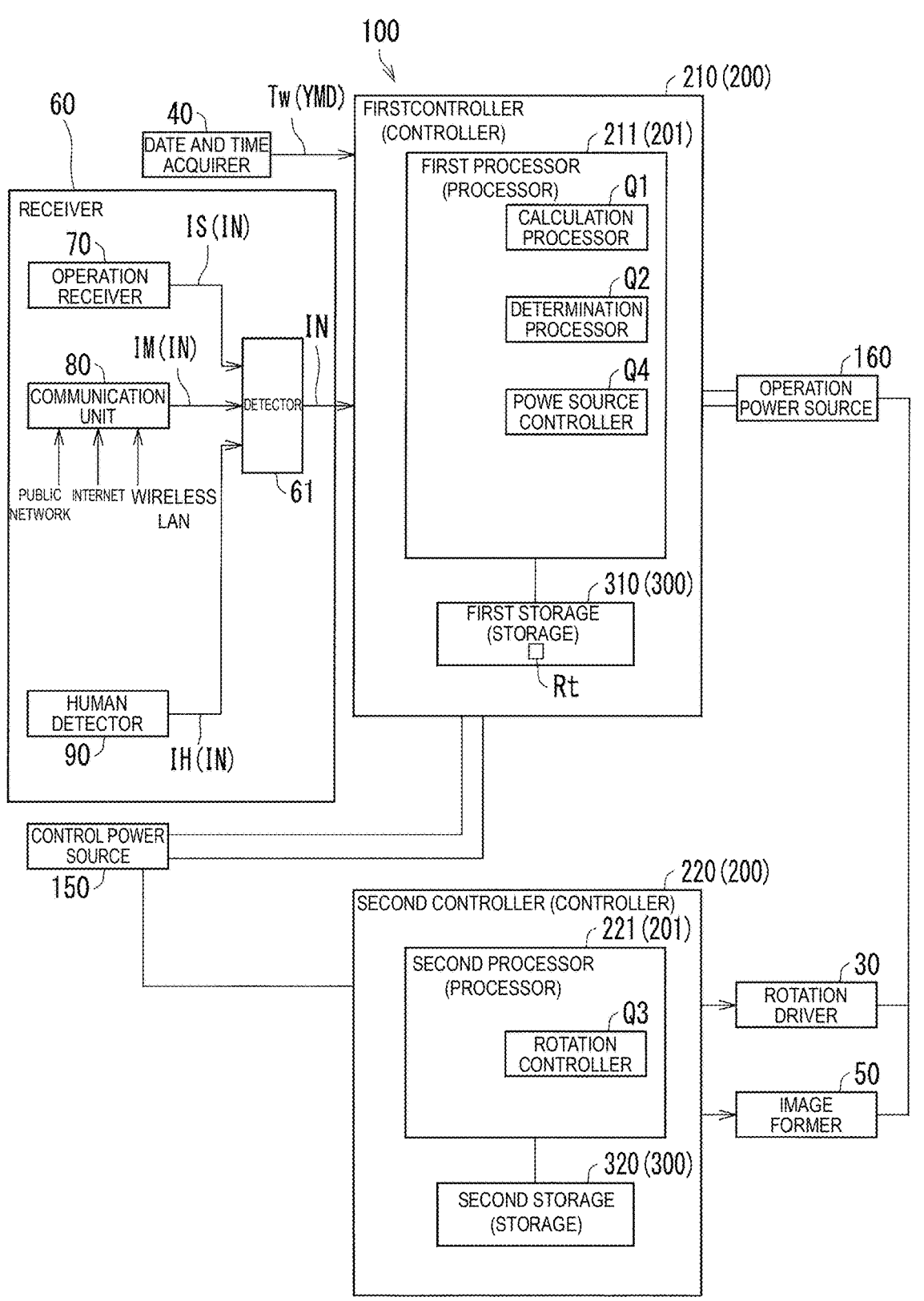
FIG. 5 is a schematic block diagram illustrating a system configuration for controlling rotation of the photoreceptor drum of the image forming device according to a second embodiment.
Figure 6:
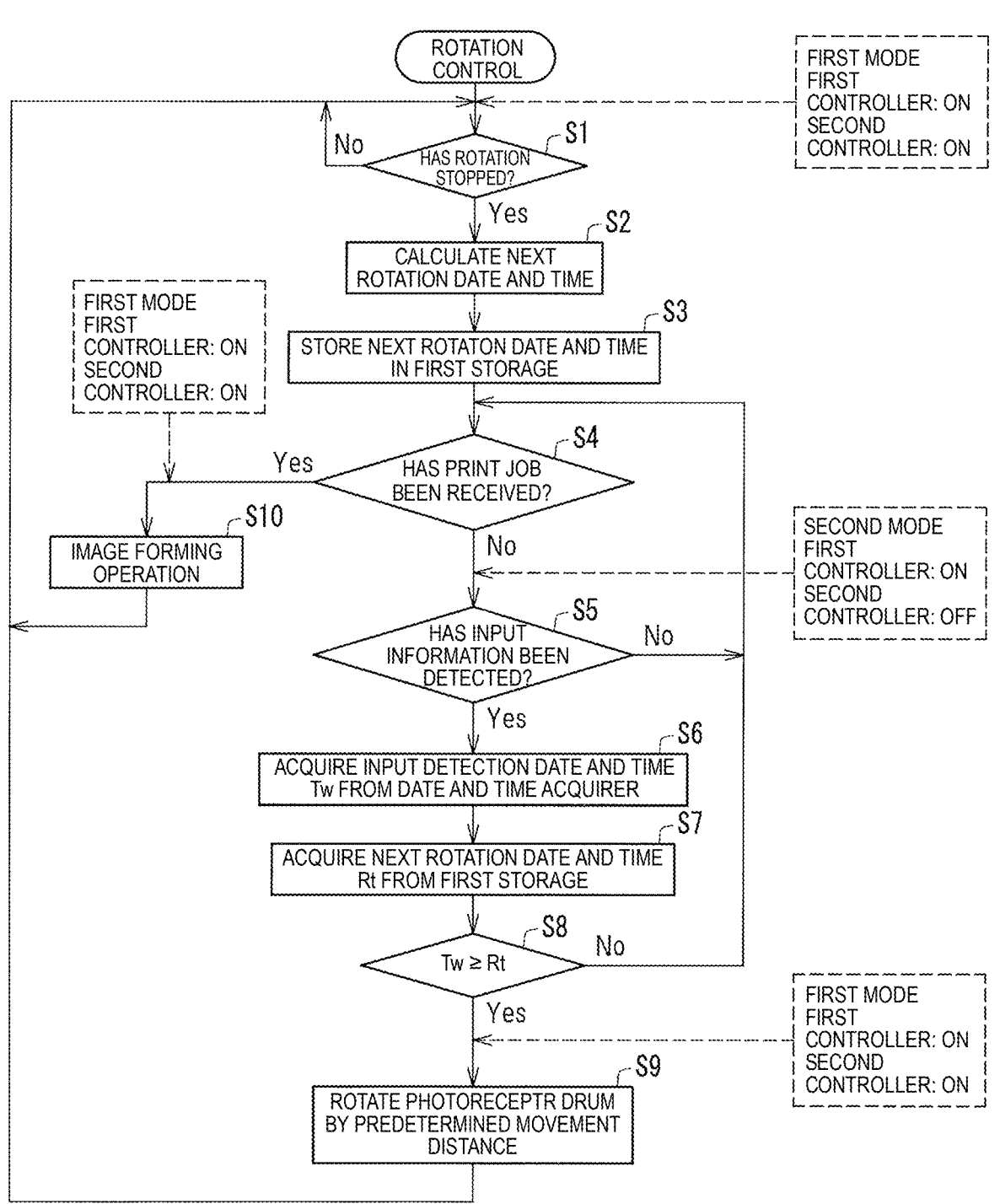
FIG. 6 is a flowchart illustrating an example of a control operation for controlling the rotation of the photoreceptor drum in the second embodiment.

FIG. 5 is a schematic block diagram illustrating a system configuration for controlling the rotation of the photoreceptor drum 1 in the image forming device 100 according to a second embodiment. FIG. 6 is a flowchart illustrating an example of a control operation for controlling the rotation of the photoreceptor drum 1 in the second embodiment.

In the image forming device 100 according to the present embodiment, the controller 200 includes two controllers (a first controller 210 and a second controller 220) in order to reduce power consumption when the image forming device 100 is left in a stationary state and is not performing the image forming processing. One of the controllers (the first controller 210) is for performing non-image forming processing which is processing other than image forming processing, and the other controller (the second controller 220) is for controlling the image former 50 to perform the image forming processing. Then, the first controller 210, which is the one of the controllers, is configured to cut off the power supply to the second controller 220, which is the other controller, when the stand-by period T2, which is a predetermined period of time, elapses after the image forming processing is completed.

In the second embodiment, substantially the same components as those of the first embodiment are denoted by the same reference signs, and descriptions thereof are omitted.

As illustrated in FIG. 5, the controller 200 includes the first controller 210 (a system controller) for performing the non-image forming processing, which is processing other than the image forming processing, and the second controller 220 (an engine controller) for performing the image forming processing. The processor 201 includes a first processor 211 (an image control unit (ICU)) and a second processor 221 (a process control unit (PCU)). The storage 300 includes a first storage 310 for performing the non-image forming operation, which is processing other than the image forming processing, and a second storage 320 for performing the image forming operation. The date and time acquirer 40 and the detector 61 are connected to an input system of the first controller 210. The rotation driver 30 and the image former 50 are connected to an output system of the second controller 220. Note that, in addition to the detector 61 and the date and time acquirer 40, a communication unit, an image processor, and the like (not illustrated) are connected to the first controller 210. In addition to the rotation driver 30 and the image former 50, the operation power source 160 (a drive power source controller, a process power source controller, and the like) is connected to the second controller 220.

As illustrated in FIG. 5, the first controller 210 and the second controller 220 respectively include the first processor 211 and the second processor 221, each of which is constituted by a computer such as a CPU, and respectively include the first storage 310 and the second storage 320, each of which includes a nonvolatile memory such as a ROM and a volatile memory such as a RAM. The first controller 210 and the second controller 220 respectively cause the first processor 211 and the second processor 221 to load control programs stored in advance in the ROMs of the first storage 310 and the second storage 320 onto the RAMs of the first storage 310 and the second storage 320, and respectively cause the first processor 211 and the second processor 221 to execute the control programs, so as to perform the operation control of the various components. The first storage 310 and the second storage 320 are connected to the first processor 211 and the second processor 221, respectively. The control power source 150 is connected to both the first controller 210 and the second controller 220.

The first controller 210 includes the calculation processor Q1, the determination processor Q2, and the power source controller Q4. The second controller 220 includes the rotation controller Q3. The calculation processor Q1 causes the first storage 310 to store the next rotation date and time Rt.

When the first mode MD1 is selected, the power source controller Q4 controls the control power source 150 to supply power to both the first controller 210 and the second controller 220, and when the second mode MD2 is selected, the power source controller Q4 controls the control power source 150 to supply power to only the first controller 210 among the first controller 210 and the second controller 220. That is, the control power source 150 constantly supplies power to the first controller 210 in the first mode MD1 and the second mode MD2, and selectively switches between the first mode MD1 and the second mode MD2 in response to the instruction signal from the power source controller Q4.

In the flowchart illustrated in FIG. 6, in the first mode MD1, when the first controller 210 detects that the rotation of the photoreceptor drum 1 has stopped (step S1: Yes), the first controller 210 causes the calculation processor Q1 to calculate the next rotation date and time Rt (step S2) and causes the first storage 310 to store the next rotation date and time Rt (step S3).

Thereafter, the first controller 210 determines whether the print job has been received (step S4), and when a state in which the print job is not received continues for the stand-by period (for example, one minute), which is a predetermined period of time shorter than the additional period, the first controller 210 (the power source controller Q4) switches to the second mode MD2 (the energy-saving mode).

The first controller 210 determines whether the detector 61 has detected the input information IN (step S5). When the input information IN is not detected (step S5: No), the first controller 210 proceeds to step S4. On the other hand, when the first controller 210 determines that the input information IN has been detected (step S5: Yes), the first controller 210 acquires the input detection date and time Tw from the date and time acquirer 40 (step S6), acquires the next rotation date and time Rt from the first storage 310 (step S7), and causes the determination processor Q2 to determine whether the input detection date and time Tw is a date and time on or after the next rotation date and time Rt (step S8).

When the first controller 210 determines that the input detection date and time Tw has not reached the next rotation date and time Rt (step S8: No), the first controller 210 proceeds to step S4. On the other hand, when the first controller 210 determines that the input detection date and time Tw is a date and time on or after the next rotation date and time Rt (step S8: Yes), the first controller 210 switches to the first mode MD1 and supplies power to the second controller 220. The second controller 220 causes the rotation controller Q3 to rotate the photoreceptor drum 1 by the predetermined movement distance (the rotation angle) using the rotation driver 30 (step S9). When the rotation of the photoreceptor drum 1 by the second controller 220 is completed, the first controller 210 controls the power source controller Q4 to switch to the second mode MD2 once again and proceeds to step S1.

Further, when the first controller 210 determines that the print job has been received (step S4: Yes), if the second mode MD2 is selected, the first controller 210 controls the power source controller Q4 to switch to the first mode MD1, and the second controller 220 causes the image former 50 to perform the image forming operation (step S10).

In this way, by using the first controller 210 for performing the non-image forming operation, it is possible to effectively prevent the photoreceptor drum 1 and the charging roller 21 from being left in contact with each other for a long period of time while further suppressing power consumption.

Third Embodiment

Although the next rotation date and time Rt is stored in the first storage 310 of the first controller 210 in the second embodiment, the next rotation date and time Rt is stored in the second storage 320 of the second controller 220 in a third embodiment.

Figure 7:
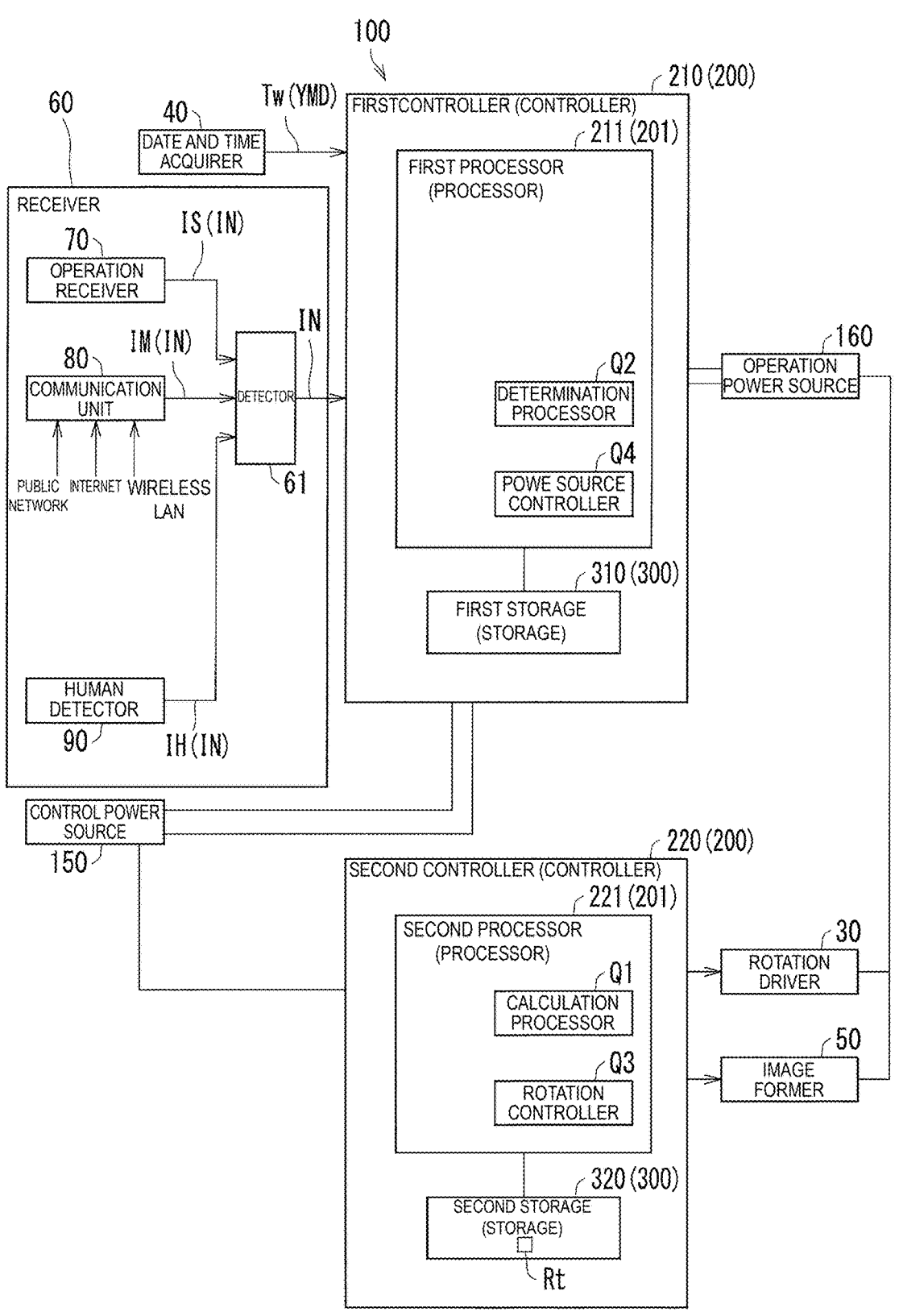
FIG. 7 is a schematic block diagram illustrating a system configuration for controlling rotation of the photoreceptor drum of the image forming device according to a third embodiment.
Figure 8:
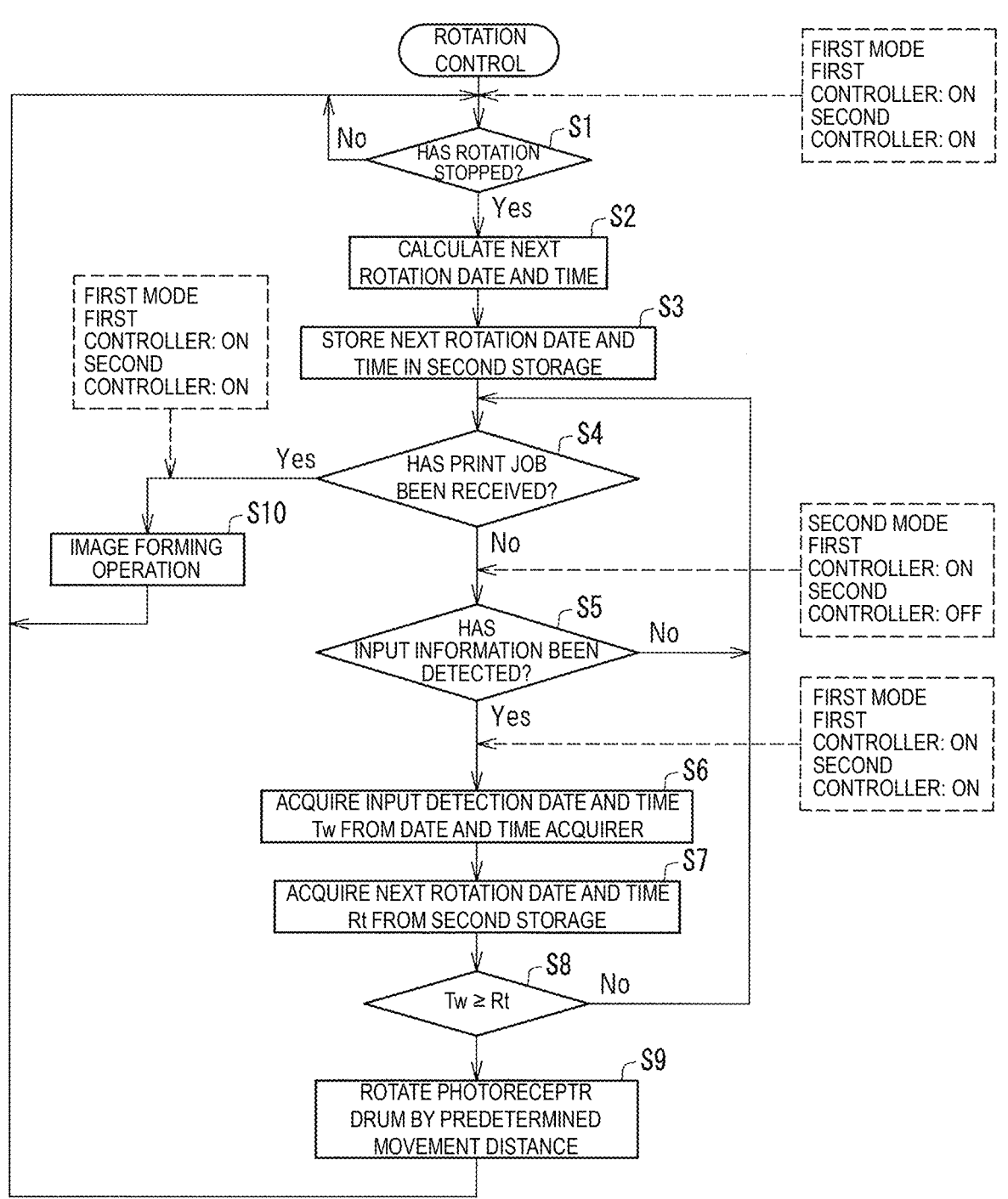
FIG. 8 is a flowchart illustrating an example of a control operation for controlling the rotation of the photoreceptor drum in the third embodiment.

FIG. 7 is a schematic block diagram illustrating a system configuration for controlling the rotation of the photoreceptor drum 1 in the image forming device 100 according to the third embodiment. FIG. 8 is a flowchart illustrating an example of a control operation for controlling the rotation of the photoreceptor drum 1 in the third embodiment.

In the third embodiment, substantially the same components as those of the first embodiment and the second embodiment are denoted by the same reference signs, and descriptions thereof are omitted.

As illustrated in FIG. 7, the first controller 210 includes the determination processor Q2 and the power source controller Q4. The second controller 220 includes the calculation processor Q1 and the rotation controller Q3, and stores the next rotation date and time Rt in the second storage 320.

As in the second embodiment, the control power source 150 supplies power to both the first controller 210 and the second controller 220 when the first mode MD1 is selected, and supplies power to only the first controller 210 among the first controller 210 and the second controller 220 when the second mode MD2 is selected.

In the flowchart illustrated in FIG. 8, in the first mode MD1, when the second controller 220 detects that the rotation of the photoreceptor drum 1 has stopped (step S1: Yes), the second controller 220 causes the calculation processor Q1 to calculate the next rotation date and time Rt (step S2) and causes the second storage 320 to store the next rotation date and time Rt (step S3).

Subsequently, it is determined whether the print job has been received (step S4). When the predetermined stand-by period continues in the state in which the print job is not received, the first controller 210 (the power source controller Q4) switches to the second mode MD2 (the energy-saving mode).

The first controller 210 determines whether the detector 61 has detected the input information IN (step S5). When the input information IN is not detected (step S5: No), the first controller 210 proceeds to step S4. On the other hand, when it is determined that the input information IN has been detected (step S5: Yes), the first controller 210 switches to the first mode MD1. Then, the first controller 210 acquires the input detection date and time Tw from the date and time acquirer 40 (step S6), acquires the next rotation date and time Rt from the second storage 320 of the second controller 220 (step S7), and causes the determination processor Q2 to determine whether the input detection date and time Tw is a date and time on or after the next rotation date and time Rt (step S8).

When the first controller 210 determines that the input detection date and time Tw has not reached the next rotation date and time Rt (step S8: No), the first controller 210 proceeds to step S4. On the other hand, when the first controller 210 determines that the input detection date and time Tw is a date and time on or after the next rotation date and time Rt (step S8: Yes), the second controller 220 causes the rotation controller Q3 to rotate the photoreceptor drum 1 by the predetermined movement distance (the rotation angle) using the rotation driver 30 (step S9), and the processing proceeds to step S1.

In this way, by using the first control portion 210 for performing the non-image forming operation and the second control portion 220 for performing the image forming operation, it is possible to effectively prevent the photoreceptor drum 1 and the charging roller 21 from being left in contact with each other for a long period of time while further suppressing power consumption.

The disclosure is not limited to the embodiments described above and can be implemented in various other forms. Thus, the above embodiments are merely examples in all respects and should not be interpreted as limiting. The scope of the disclosure is indicated by the claims and is not limited to the description. Furthermore, all modifications and changes equivalent in scope with the claims are included in the scope of the disclosure.

REFERENCE SIGNS LIST

1 Photoreceptor drum (an example of an image carrier)
2 Charging device

30 Rotation driver
40 Date and time acquirer
50 Image former
21 Charging roller (an example of a charging member)
60 Receiver
70 Operation receiver
80 Communication unit
90 Human detector
100 Image forming device
150 Control power source
160 Operation power source
200 Controller
201 Processor
210 First controller
211 First processor
220 Second controller
221 Second processor
300 Storage
310 First storage
320 Second storage
IH Human detection information
IM Communication information
IN Input information
IS Non-rotation operation information
MD1 First mode
MD2 Second mode
Q1 Calculation processor
Q2 Determination processor
Q3 Rotation controller
Q4 Power source controller
Rt Next rotation date and time
T2 Stand-by period
Tw Input detection date and time
YMD Date and time

The invention claimed is:

1. An image forming device comprising:
an image carrier;
an image former including a charging member that comes into contact with a surface of the image carrier and charges the surface of the image carrier;
a rotation driver that rotationally drives the image carrier;
a date and time acquirer that acquires a date and time;
a receiver that receives predetermined input information, the predetermined input information being an operation and/or a state of predetermined processing, or being data;
a controller; and
a storage,
wherein the controller includes
a calculation processor that acquires, from the date and time acquirer, a rotation stop date and time, which is a date and time when rotation of the image carrier has stopped, and that stores, in the storage, a date and time obtained by adding a predetermined additional period to the acquired rotation stop date and time, as a next rotation date and time, and
a determination processor that acquires a date and time from the date and time acquirer when the receiver has received the predetermined input information, and that determines whether an input detection date and time, which is the acquired date and time, is a date and time on or after the next rotation date and time stored in the storage, and
when the determination processor determines that the input detection date and time is the date and time on or after the next rotation date and time, the controller performs predetermined distance rotation control of driving the rotation driver to rotate the image carrier by a predetermined movement distance and then stopping the image carrier.

2. The image forming device according to claim 1, wherein when the predetermined distance rotation control is performed and the image carrier is stopped, the calculation processor calculates the next rotation date and time and stores the next rotation date and time in the storage to update the next rotation date and time.

3. The image forming device according to claim 1, wherein the predetermined movement distance is more than one time and equal to or less than five times a contact width of a contact portion between the charging member and the image carrier in a circumferential direction.

4. The image forming device according to claim 1, further comprising:
a control power source that supplies power to the controller; and
an operation power source that supplies power to the image former and the rotation driver,
wherein the controller selectively executes a first mode of supplying power from the control power source to the controller and supplying power from the operation power source to the image former and the rotation driver, and a second mode of supplying power from the control power source to the controller and turning off the operation power source,
the controller executes the first mode during a stand-by period being a period shorter than the additional period from the rotation stop date and time, and executes the second mode when the receiver does not receive the predetermined input information during the stand-by period, and
when the receiver receives the predetermined input information during the execution of the second mode, the controller causes the determination processor to make the determination.

5. The image forming device according to claim 4, wherein the storage includes a first storage used when performing non-image forming processing being processing other than image forming processing,
the controller includes a first controller that performs the non-image forming processing and a second controller that performs the image forming processing,
the first controller includes the calculation processor, the determination processor, and the first storage,
the second controller includes the rotation driver,
the date and time acquirer and the receiver are connected to the first controller,
the control power source supplies power to both the first controller and the second controller when the first mode is selected, and supplies power to only the first controller when the second mode is selected, and
the first controller causes the first storage to store the next rotation date and time calculated by the calculation processor, executes the first mode when the determination processor determines, during the second mode, that the input detection date and time is the date and time on or after the next rotation date and time, and executes the second mode once again after the second controller has performed the predetermined distance rotation control.

6. The image forming device according to claim 4, wherein the storage includes a second storage used when performing image forming processing, the controller includes a first controller that performs non-image forming processing being processing other than the image forming processing and a second controller that performs the image forming processing, the first controller includes the determination processor, the second controller includes the calculation processor, the second storage, and the rotation driver, the date and time acquirer and the receiver are connected to the first controller, the control power source supplies power to both the first controller and the second controller during execution of the first mode, and supplies power to only the first controller during execution of the second mode, the second controller causes the second storage to store the next rotation date and time calculated by the calculation processor, and the first controller executes the first mode when causing the determination processor to determine whether the input detection date and time is a date and time on or after the next rotation date and time, reads out the next rotation date and time from the second storage, and determines whether to perform the predetermined distance rotation control.

7. The image forming device according to claim 1, wherein when the input information is an execution of image forming processing, without performing the predetermined distance rotation control, the controller controls the rotation driver to rotate the image carrier to cause the image former to form an image, causes the calculation processor to calculate the next rotation date and time at a timing when the image carrier is stopped after the image forming processing is completed, and causes the storage to store the next rotation date and time to update the next rotation date and time.

8. The image forming device according to claim 1, comprising an operation receiver that receives an input operation by an operator, wherein the input information includes non-rotation operation information indicating, of the input operation received by the operation receiver, a non-rotation operation that does not cause the image carrier to rotate.

9. The image forming device according to claim 1, comprising an input unit that receives an input of communication information from an external device, wherein the input information includes the communication information received by the input unit.

10. The image forming device according to claim 1, comprising a human detector that detects an approach of a person, wherein the input information includes human detection information indicating that the human detector has detected the person.

* * * * *